United States Patent [19]
Fisher

[11] 3,961,681
[45] June 8, 1976

[54] MOBILE SCAFFOLD WITH SERIES-CONNECTED HYDRAULIC MOTOR DRIVE

[75] Inventor: Robert E. Fisher, Larkspur, Calif.

[73] Assignee: Up-Right, Inc., Berkeley, Calif.

[22] Filed: July 1, 1974

[21] Appl. No.: 484,811

[52] U.S. Cl. ............................. 180/66 R; 60/468; 60/484; 60/494; 182/14; 182/16; 182/63
[51] Int. Cl.² ..................... B60K 41/16; E04G 1/24
[58] Field of Search .............. 180/66 R, 66 A, 66 F, 180/6.48, 6.3, 44 M, 44 F; 60/424, 494, 468, 484; 182/63, 12, 13, 14, 16, 17

[56] References Cited
UNITED STATES PATENTS

| | | | |
|---|---|---|---|
| 1,354,777 | 10/1920 | Rock | 60/494 |
| 2,361,098 | 10/1944 | Higby | 60/424 |
| 2,807,935 | 10/1957 | Lapsley | 180/66 R X |
| 2,970,667 | 2/1961 | Bercaw | 182/13 X |
| 3,424,260 | 1/1969 | Stone et al. | 180/66 R |
| 3,596,735 | 8/1971 | Denier et al. | 182/63 X |
| 3,788,075 | 1/1974 | Holdeman et al. | 60/484 X |
| 3,864,910 | 2/1975 | Mechin | 60/468 X |

FOREIGN PATENTS OR APPLICATIONS
| | | | |
|---|---|---|---|
| 271,662 | 2/1951 | Switzerland | 60/484 |

*Primary Examiner*—M. H. Wood, Jr.
*Assistant Examiner*—Milton L. Smith
*Attorney, Agent, or Firm*—Phillips, Moore, Weissenberger Lempio & Strabala

[57] ABSTRACT

A base frame with four wheels, two of which are powered by separate hydraulic motors connected in series so that the fluid flowing through one motor then flows through the other. A speed control is provided whereby the constant output of a hydraulic pump either passes entirely through the motors or is partially bypassed around the pump.

8 Claims, 6 Drawing Figures

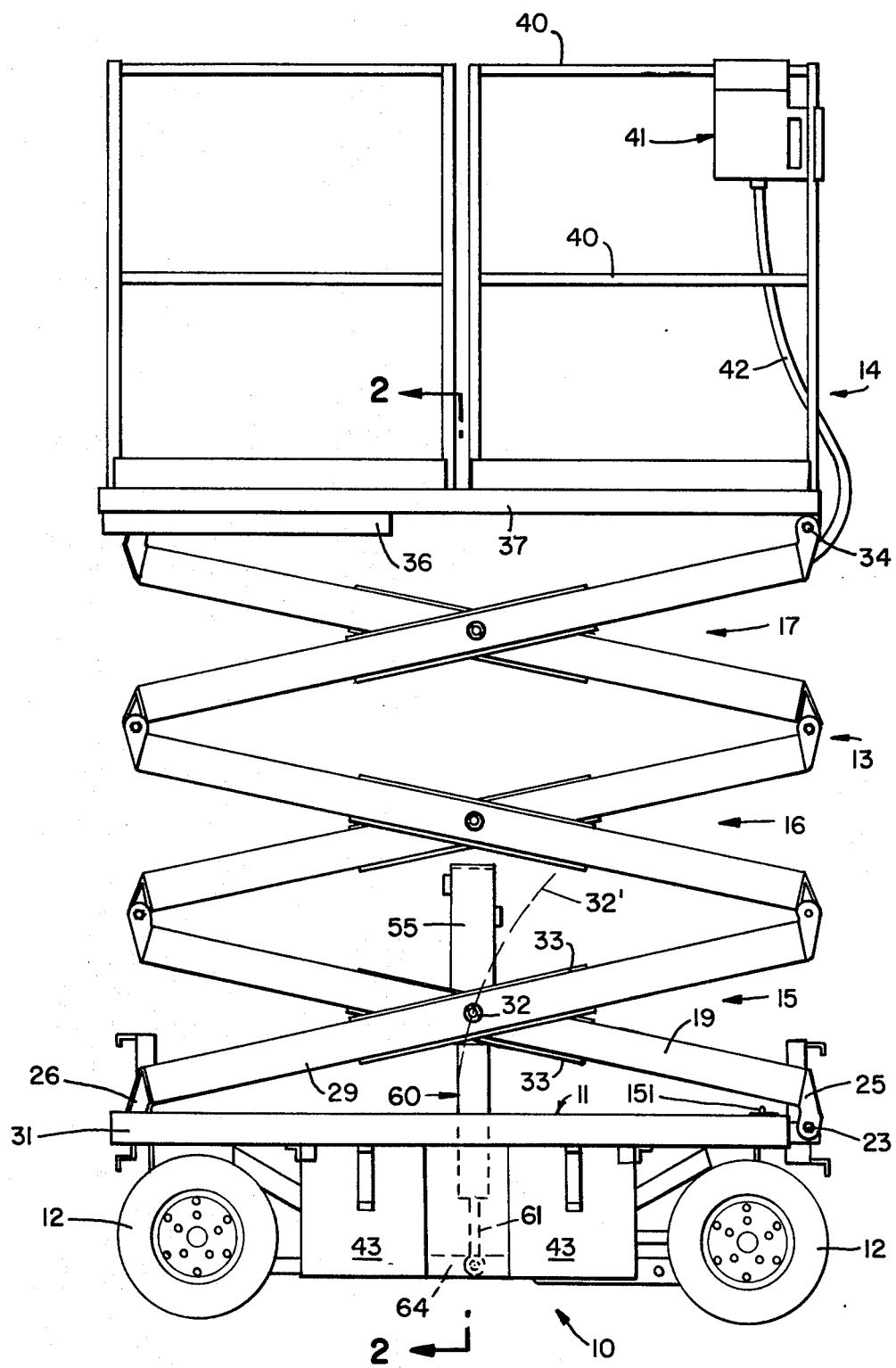
FIG_1

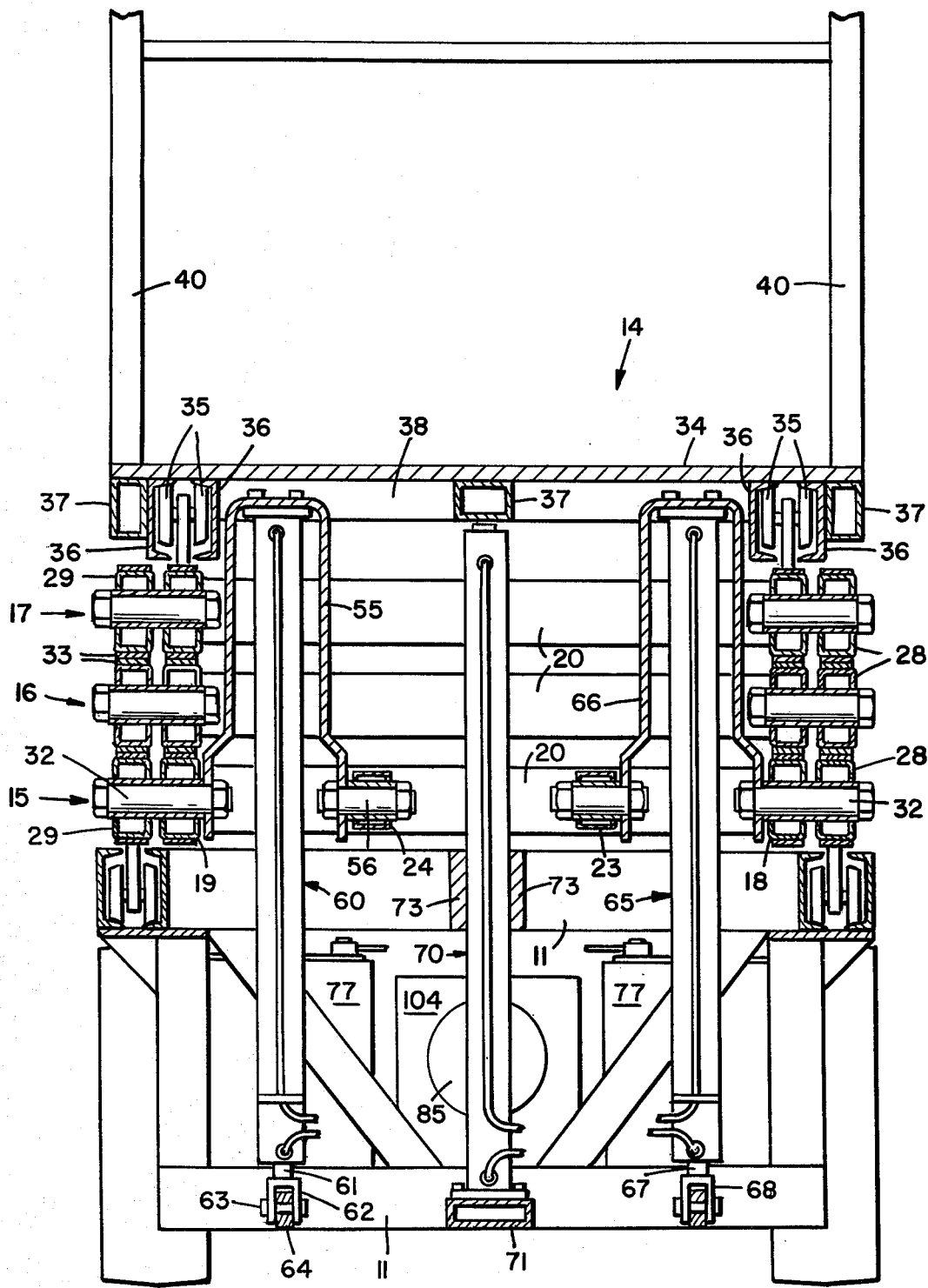
FIG_2

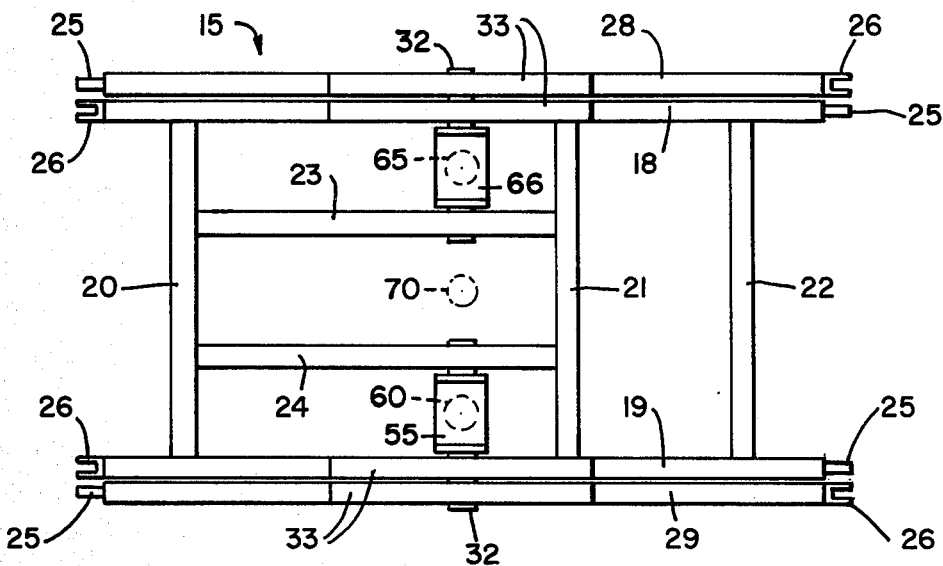
FIG_3
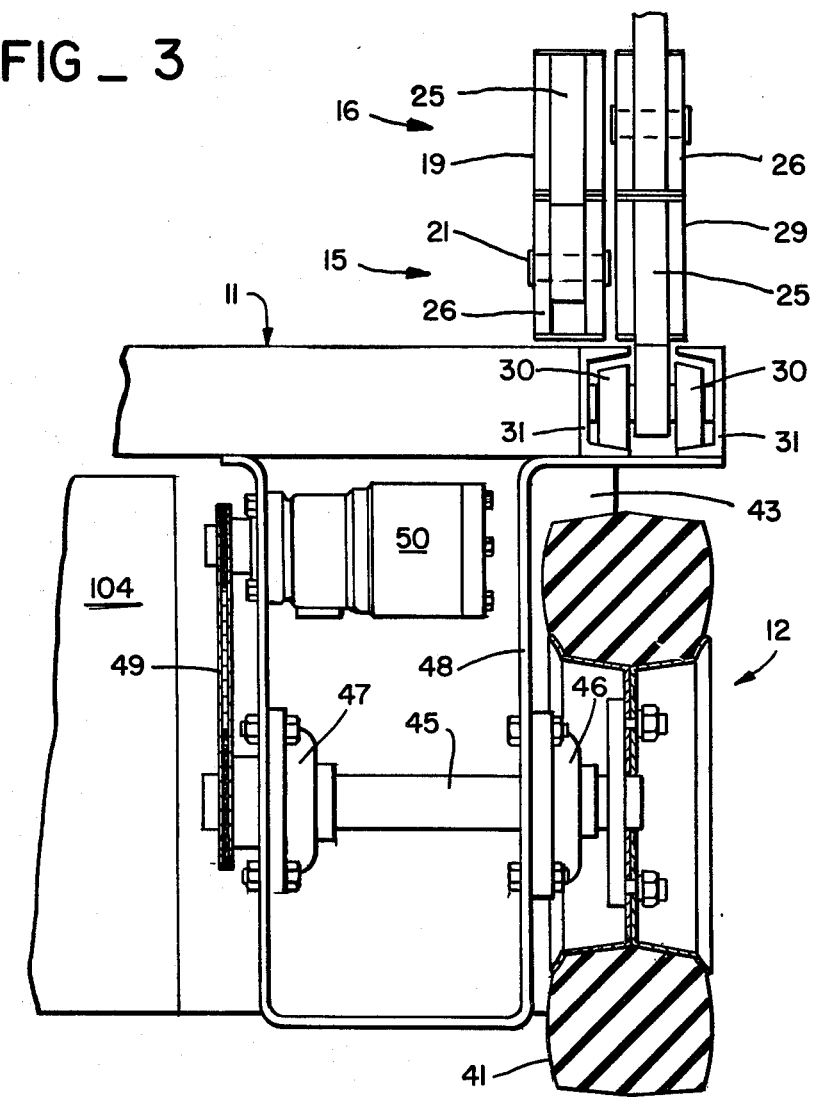
FIG_4

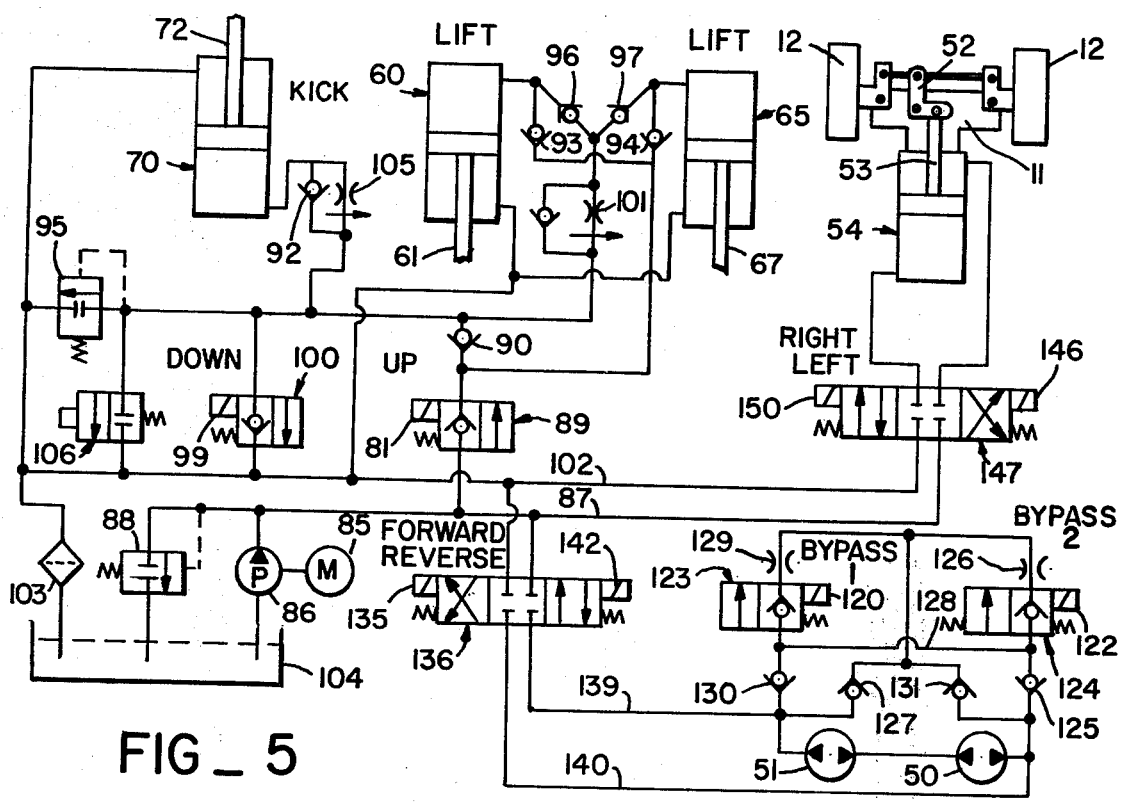
FIG_5
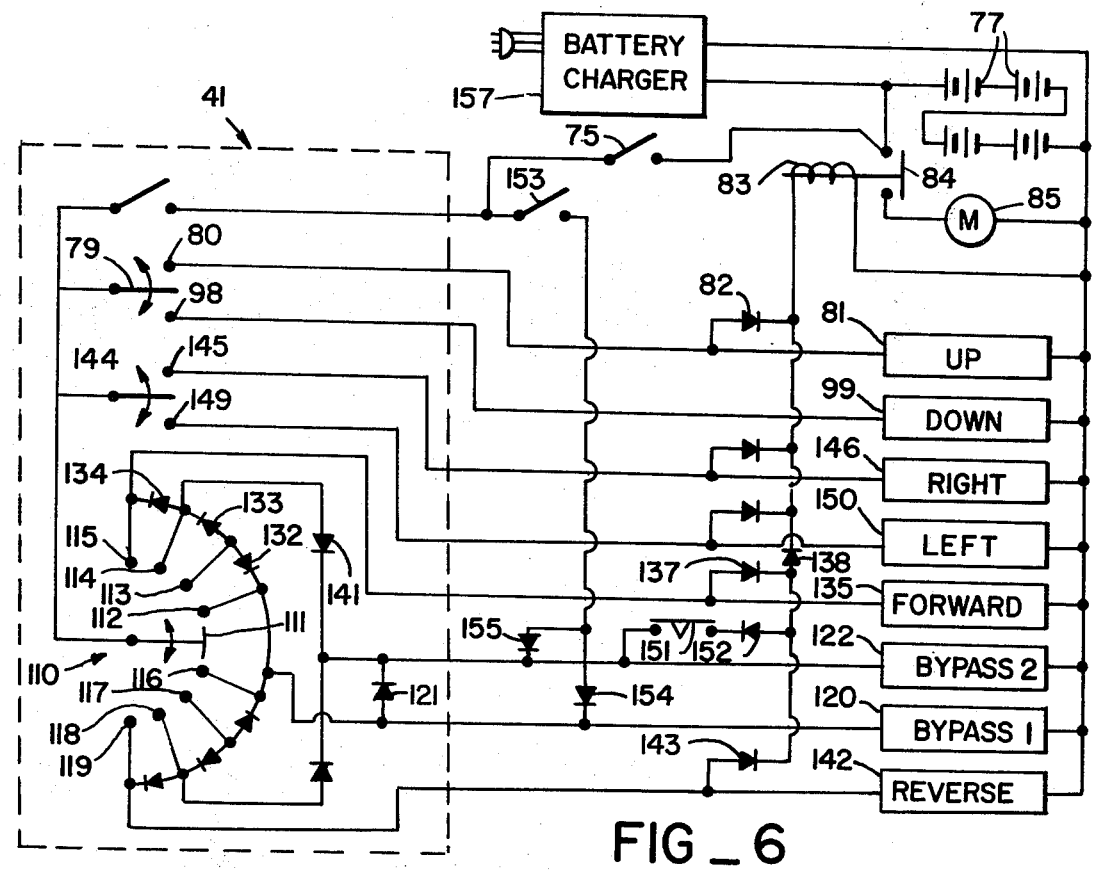
FIG_6

MOBILE SCAFFOLD WITH SERIES-CONNECTED HYDRAULIC MOTOR DRIVE

BACKGROUND OF THE INVENTION

Various types of mobile scissors scaffold devices are presently available on the commercial market. In general these scaffolds have a wheeled frame, a vertically extensible and collapsible scissors assembly on the frame and a work platform carried on the upper end of the scissors assembly. Most of these devices are large in size.

There is a need for a small scissors scaffold of this type which can be more maneuverable, pass through narrow aisles and relatively small doors, fit into small work spaces and be transportable by small trucks or trailers. In addition, such a scaffold must be as inexpensive as possible in order to be competitive with other types of small mobile extensible scaffolds. At the same time, the scaffold should have all of the operational advantages found in larger, more expensive devices. Reduction in size results in less space in the device in which to put the operating components. Special parts may be designed to fit into the smaller space but this will increase the cost. Standard parts of small size may be used but with a decrease in working effectiveness.

It is the primary object of this invention to provide a small scissors scaffold utilizing inexpensive and readily available components, with such components being arranged for maximum efficiency.

It is a further object of this invention to provide such a scaffold having the operational advantages of more expensive scaffolds. In particular, the present scaffold can be operated by a workman standing on the work platform. From there, he can drive the scaffold forwardly or backwardly, and at different speeds, steering as he goes, whether the platform is raised or lowered. When the scaffold reaches its desired destination, the operator can lock the drive wheels against movement without demounting. The operator can then cause the platform to raise to any desired level and can lower the platform.

SUMMARY OF THE INVENTION

The present invention is a self-contained device, carrying its own power unit which comprises a hydraulic system for performing the various desired functions, the hydraulic system including a hydraulic pump driven by a d.c. motor. Although any d.c. motor could be used, the continuous types have a high amount of copper, require rigorous cooling and are relatively expensive. In order to avoid these problems, a standard automobile starter motor is used, such motors being inexpensive, small in size and yet having a high starting and running torque. The motor is powered by four standard storage batteries, such as used in golf carts. These batteries are placed as low as possible and outwardly of the centerline of the machine so that their weight is used to provide stability to the device.

The mobile scaffold incorporates a hydraulic drive system powered by the hydraulic pump and which includes two separate hydraulic motors, each drivingly connected to one of the two drive wheels, the hydraulic motors being connected in series so that all the fluid through one of the motors will flow through the other. By this arangement the traction efficiency is maintained even though one of the drive wheels is lifted partially or completely off the floor. At the same time, the series-connected hydraulic motors will provide a limited degree of differential action between the drive wheels, shock absorption and a compact packaging of components into a small frame.

A remote control system is provided whereby the operator can cause fluid to flow through the hydraulic drive motors in either direction for forward or reverse movement. In addition an inexpensive system is provided whereby the fluid from the pump can pass completely through the drive motors or be partially bypassed therearound so that different speeds of movement may be obtained.

The control system is also arranged so that when the mobile frame arrives at its desired destination, flow through the hydraulic motor is blocked so that the wheels are locked against movement.

Other objects and advantages will be apparent in the course of the following detailed description.

BRIEF DESCRIPTION OF THE DRAWINGS

In the drawings forming a part of this application, and in which like parts are designated by like reference numerals throughout the same, FIG. 1 is an elevational side view of a scissorstype mobile scaffold utilizing the present invention and in partially extended position;

FIG. 2 is a transverse sectional view, taken on line 2—2 of FIG. 1, with the scissors mechanism in collapsed position.

FIG. 3 is a detail view, in plan, illustrating the lower scissors stage;

FIG. 4 is an elevational view of part of the rear end of the mobile scaffold of FIG. 1;

FIG. 5 illustrates the hydraulic system of the mobile scaffold of FIG. 1;

FIG. 6 illustrates the electrical system of the mobile scaffold of FIG. 1.

DESCRIPTION OF THE PREFERRED EMBODIMENT

Referring now to the drawings, the mobile scaffold 10 comprises a main frame 11 supported by wheels 12, a multistage scissors assembly 13 and a work platform 14 mounted on the upper end of the scissors assembly. By way of example, a prototype of the mobile scaffold described herein has a main base frame 39 inches wide and 70 inches long. The upper surface of the work platform is 41 inches off the ground when contracted and is extendible to 14 feet from the ground.

The illustrated scissors assembly comprises a lower stage 15, an intermediate stage 16 and an upper stage 17. If desired, more or less stages may be provided. As best seen in FIGS. 1 and 3, the lower scissors stage 15 comprises an inner frame made up of longitudinal opposed tubular scissors elements 18 and 19, cross braces 20, 21 and 22 rigidly connected at their ends to the scissors elements 18 and 19, and longitudinal inner braces 23 and 24 extending between and rigidly secured to cross braces 20 and 21. Scissors elements 18 and 19 each have a downwardly extending lug 25 at one end which is pivotally mounted on a pivot pin 23 on the frame 11, and a clevis 26 on the other end for pivotal connection by pin 27 to the lug 25 of the inner frame of the intermediate scissors stage 16.

The lower scissors stage 15 also includes longitudinal opposed tubular scissors elements 28 and 29 outwardly of the inner frame. These scissors elements each have a depending lug 25 at one end thereof which carry rollers 30 for longitudinal movement in the channel member 31 fixed to the main frame 11. The scissors elements 27 and 28 each have a clevis 26 on the other end for pivotal connection to the lug 25 of the corresponding outer scissors elements of the intermediate scissors stage.

Both of the spaced-apart pairs of scissors elements, 18–28 and 19–29, are pivotally connected together at their midpoints by transverse horizontal pins 32. The scissors elements 18, 19, 28 and 29 are also provided on top and bottom thereof with longitudinally extending stiffeners 33 which strengthen the middle of the elements and also prevent them from contracting to an over-center position.

The intermediate and upper scissors stages are similarly constructed in a manner as thus far described, and corresponding elements of the stages have the same reference numerals applied thereto. With reference to the upper stage, the outer scissors elements 19 and 29 thereof are pivotally mounted to platform 14 by pivot pins 34, while scissors elements 18 and 28 have rollers 35 thereon which ride in channels 36 on the bottom of the platform.

Platform 14 includes a frame having a suitable number of longitudinal frame tubes 37 and cross frame tube 38 to support flooring 39. Guard rails 40 extend around the periphery of the platform. A control box 41 is mounted at a convenient place on the guard rails, and is connected by electric cable 42 which extends back and forth along the interconnected scissors elements on one side of the scissors assembly down to the main frame 11.

Main frame 11 has four battery compartments 43 thereon, two of which are seen in FIG. 1, the other two being on the opposite side of the frame. These compartments are as close to the ground as possible, while still providing for sufficient ground clearance, and are located outwardly of the centerline of the machine so that the weight of the batteries therein will increase the stability of the apparatus. The battery weight is not insignificant, since golf cart batteries weigh in the order of 75 pounds each.

Wheels 12 preferably have relatively unyielding solid rubber tires 44, again for stability purposes. As seen in FIG. 4, the axle 45 of the right rear wheel 12 is journaled in bearings 46 and 47 carried by frame pedestal 48, and is driven by chain 49 and hydraulic motor 50. The left rear wheel 12 is similarly mounted on the other side of frame 11 and is driven by a separate hydraulic motor 51. The two front wheels 12 are conventionally mounted on frame 11, as schematically illustrated in FIG. 5, for right and left turning by movement of bell crank 52 produced in response to actuation of piston rod 53 by the double-acting hydraulic cylinder 54.

Referring to FIG. 2, the lower scissors stage 15 has an upwardly extending yoke 55 secured thereto, one side of the lower end of the yoke being pivotally mounted on pin 32 adjacent scissors element 19 and the other side of the yoke being pivotally mounted on pin 56 which is carried by brace 24 in axial alignment with pin 32. The body of hydraulic ram 60 is secured at its upper end to yoke 55. The piston rod 61 extends downwardly and has a clevis 62 at its lower end which is pivotally connected by pin 63 to the longitudinal frame member 64 situated at the bottom of frame 11. A second hydraulic ram 65 is similarly secured by yoke 66 to the lower scissors stage on the opposite side of the longitudinal centerline of the frame, with its piston rod 67 secured by clevis 68 to the bottom of the frame. A third hydraulic ram 70 is mounted on longitudinal frame member 71 on the bottom of and centrally of frame 11, with its piston rod 72 being extended upwardly against the central frame tube 34 of platform 14. Frame members 73 provide lateral support for ram 70. As may be seen from FIG. 2, the bodies of the vertically disposed rams 60, 65 and 70 extend virtually the entire distance from the bottom of the frame to the bottom of platform 14. Since the length of the stroke of the piston rods is dependent on the length of the bodies of the rams, this arrangement enables rams to be disposed vertically, completely under the platform and still have as long a length stroke as possible. Even longer rams could be used if they were to extend up through holes in the platform. However, it is customarily desired that nothing should project through the platform since this would interfere with loading of articles onto the platform when it has been lowered.

It is also to be noted that the lift rams 60 and 65 are upside-down, in that their cylinder bodies are attached to yokes 55 and 66 and their pistons 61 and 67 act downwardly. This arrangement enables standard commercially available rams to be used without having to provide a lug or clevis on the end of the ram body so that it can be pivotally mounted. A pivotal connection is necessary, since the pins 32 travel through an arcuate path 32' (FIG. 1) as the scissors stages extend and retract. Since the yokes are free to pivot about pins 32 and 56, the ram body can be directly and rigidly connected to its yoke which will allow the ram body to pivot during extension and retraction of the scissors assembly. Although a pivot lug or clevis on the end of the ram body would only require a few inches of space, for a three-stage scissors assembly every inch of stroke of the lift ram pistons will produce six inches of vertical movement of the platform.

OPERATION

The operation of the mobile scaffold 10 is best considered with reference to the hydraulic and electrical diagrams of FIGS. 5 and 6.

Main switch 75, preferably a key-type switch to prevent unauthorized use of the scaffold, is closed, and off-on switch 76 on the control panel 41 is closed, to supply voltage from batteries 77 to bus 78. The operator can now cause the platform 14 to elevate by closing the "Up-Down" switch 79 against contact 80, thus completing the circuit to the "Up" solenoid 81. At the same time, a circuit is completed through diode 82 to relay 83, causing relay contacts 84 to close so that the motor 85 is energized by the batteries. As mentioned previously, motor 85 is preferably an inexpensive d.c. motor commonly used in automobiles as a starter motor. Motor 85 drives hydraulic pump 86 to supply fluid pressure to common line 87. Merely by way of example, in the aforementioned prototype, the pump has a flow of 3 gpm at no load and a flow of 2.5 gpm at 2000 psi pressure. Pressure in line 87 is communicated to the shuttle of spring-loaded valve 88 so that valve 88 will relieve excessive pressure in line 87. In the aforementioned prototype, this is set to operate at 2600 psi.

Since the Up solenoid 81 has been energized, the shuttle of Up valve 89 has moved to the left (as seen in FIG. 5) allowing fluid from common line 87 to flow therethrough, and then through check valve 90, line 91 and check valve 92 to the lower end of the central kick cylinder 70. At the same time, the fluid flowing through Up valve 89 flows through check valves 93 and 94 to the upper ends of lift rams 60 and 65. The purpose of the kick ram 70 is to assist in the initial elevation of the platform, so that the scissors elements will move out of parallelism with each other. Piston 72 acts upwardly directly on platform 14, causing it to move upwardly, pulling the scissors elements therewith. During such time, lift rams 60 and 65 also aid in the initial extension. Thus, when most power is needed, all three rams act together so that the pressure in the hydraulic system will be as low as possible, with a resulting increase in hydraulic efficiency. In due course, piston 72 will be fully extended. Thereafter the lift rams 60 and 65 take over, applying an essentially vertical lifting force to the midpoints of the opposed pairs of scissors elements of the lower scissors stage. Through the pivotal connections between the scissors stages, extension of the lowest stage will cause a corresponding extension of the other scissors stages and a consequent raising of the platform 14. Since the pressure fluid is free to flow upwardly through both check valves 93 and 94, the pressure applied to both pistons 61 and 67 will be equal at all times during elevation of the platform.

Pressure relief valve 95, responsive to the pressure in line 91, is employed so that if the platform is overloaded in the beginning, valve 95 will open to bleed off pressure in line 91 so that the platform cannot be raised until the overload is removed therefrom. By way of example, in the aforementioned prototype, the valve 95 is set to operate at 1300–1400 psi, which will lift a load of 1000 pounds on the platform.

At any time during elevation, or after full elevation, the "Up" switch 79 can be opened, de-energizing the Up solenoid 81, relay 83 and motor 85. Check valves 93 and 94 now prevent flow of fluid from rams 60 and 65 back down through the Up valve 89. Fluid from rams 60 and 65 could flow through check valves 96 and 97, but check valve 90 prevents such flow from flowing down through the Up valve 89. Check valves 96 and 97 also serve to prevent flow from lift ram; 60 to lift ram 65 or vice versa, which is important for stability purposes after elevation of the platform. For example, suppose the workman or other load on the platform were to move to the side of the platform above lift ram 60. If the rams 60 and 65 were in direct fluid communication with each other, the increase in downward force on ram 60 would cause fluid therein to flow to ram 65, causing an undesirable tilting of the platform.

To lower the scaffold, the operator closes the Up-Down switch 79 against the "Down" contact 98 to energize the Down solenoid 99 of the Down hydraulic valve 100. Motor 85 is not energized. Fluid from the lift rams 60 and 65 can now flow simultaneously through check valves 96 and 97, and through the constant flow device 101 to line 91 and then through the now open Down valve 99 to the return line 102 and thence through filter 103 to sump 104. In due course, platform 14 will come down onto piston 72 of the kick ram 70. The fluid therein will flow out through the constant flow device 105 to line 91, valve 100 and return line 102. The constant flow devices 101 and 105 are adjusted so that the rate of descent is within safe limits regardless of the load on the platform. If desired, a manually operable valve 106 is provided on the main frame, in parallel to Down valve 100, so that the platform can be lowered by a workman at ground level.

The mobile scaffold is also arranged to be driven, either forwardly or rearwardly and at different speeds by actuation of the drive control switch 110 which has a switch member 111 movable from its illustrated neutral position into engagement with one of the "Forward" contacts 112, 113, 114 and 115 or with one of the "Reverse" contacts 116, 117, 118 and 119.

When switch member 111 engages contact 112, it closes a circuit directly to "Bypass 1" solenoid 120, and through diode 121 to "Bypass 2" solenoid 122, causing both of the "Bypass" valves 123 and 124 to shift to full open position. This enables fluid to flow to the right through the series connected hydraulic motors 50 and 51, up through check valve 125, Bypass 2 valve 124, flow restrictor 126, down through check valve 127 and back to motor 50. At the same time, the fluid flowing up through check valve 125 can also flow through line 128, Bypass 1 valve 123, flow restrictor 129 and back through check valve 127 to motor 50. Conversely, fluid may flow to the left through the series connected motors 50 and 51, up through check valve 130, Bypass 1 valve 123, flow restrictor 129, down through check valve 131 to motor 50. Such fluid can also flow through line 128, Bypass 2 valve 124, flow restrictor 126, and check valve 131 to motor 50. This arrangement, wherein fluid can circulate through the motors 50 and 51, in either direction, is referred to as the "free-wheeling" condition.

The switch member 111 can now be advanced to engage contact 113. Current can flow through diode 132 so that both Bypass solenoids 120 and 121 remain energized. Current also flows through diodes 133 and 134 and causes the Forward solenoid 135 to be energized, shifting the "Forward-Reverse" valve 136 to the left. At the same time, current will flow through diodes 137 and 138 to energize relay 83 to start motor 85 and hydraulic pump 86. Pressure fluid from line 87 can now flow through valve 136 to line 139, to the right through motors 51 and 50, and then by line 140 back through valve 136 to the return line 87. At the same time, fluid can flow up through check valve 130, through both Bypass valve 123 and 124 and the flow restrictions 126 and 129 and then through check valve 131 to line 140. The flow through the flow restrictors, which are thus connected in parallel with each other and with the motors 50 and 51, will thus cause a considerable amount of the pressure fluid in line 139 to bypass the motors so that they will drive the scaffold forwardly at a low speed. In the aforementioned prototype, this low, or "creep", speed is in the order of 0.5 mph.

If the switch member 111 is now moved to contact 113, a circuit will be completed through diode 141 to energize Bypass 2 solenoid 122. Diodes 133 and 121 will prevent Bypass 1 solenoid 120 from being energized. Bypass 1 valve 129 thus returns to its position illustrated in FIG. 5. The pressure fluid in line 139 can now bypass motors 50 and 51 only through the flow restrictor 126. As a consequence, more fluid is forced through motors 50 and 51 and the forward speed of the scaffold is increased, as for example to one mph.

When the switch member 111 is moved to contact 115, the Forward solenoid and motor 85 remain energized as before, but diode 134 prevents energization of either Bypass solenoid. Thus, all of the pressure fluid in line 139 must flow through motors 50 and 51, applying full power to the wheels, so that, for example, a full speed of 2 mph is obtained.

Although the hydraulic pressure to the lift rams is limited by valve 95, the full pressure of the system, as limited by valve 88, is available for driving purposes.

The mobile scaffold can be driven in a reverse direction when desired. Movement of switch member 11 to contact 116 causes the two Bypass solenoids 120 and 121 to be energized, shifting the two Bypass valves 123 and 124 to open, or free-wheeling, position. Movement of switch 111 to contact 117 energizes the two Bypass solenoids, Reverse solenoid 142 and, through diode 143, relay 83 and motor 85 so that the scaffold is driven at low speed. The Forward-Referse valve 136 has now been shifted to the right from its illustrated position so that fluid flows in an opposite direction through motors 50 and 51. Similarly, when switch 111 engages contact 118, only the Bypass 2 valve is actuated and the wheels are driven at intermediate speed. Full reverse power is delivered to the wheels when switch 111 engages contact 119.

When the scaffold has been moved to its desired position, switch member 111 is returned to its illustrated neutral position. At such time, none of the solenoids 120, 122, 135 or 142 is energized. As a consequence, all flow through motors 50 and 51, in either direction, is blocked and the wheels are thus locked against movement.

Steering is accomplished by the "Right-Left" switch 144. When the switch engages contact 145, the "Right" solenoid 146 is energized and the Right-Left valve 147 is actuated thereby. A circuit is also completed through diode 148 to relay 83 so that the hydraulic pump 86 is driven. Pressure fluid in line 87 can now flow through the Right-Left valve to steering cylinder 54. Piston 53 moves inwardly into the cylinder to cause the front wheels 12 to turn to the right. Similarly, closing of switch 144 against contact 149 energizes "Left" solenoid 150 and relay 83, so that pressure fluid in line 87 can flow through valve 147 and cause extension of piston 53 and left turning of the wheels.

In order to prevent fast forward or reverse movement when the platform has been raised, a microswitch 151 is positioned on the main frame so as to close after a limited amount of upward movement of the platform. As may be seen from FIG. 6, whenever the Forward or Reverse solenoids 135 or 142 are energized, a circuit will be completed through diode 152 to the microswitch 151. If this switch is closed, as it will be if the platform is raised, Bypass 2 solenoid 122 will be energized. Thus, even if switch 111 is moved to contacts 115 or 119 for full speed, the Bypass 2 valve 124 remains open to bypass fluid around motors 50 and 51 and thus limit the speed of the scaffold.

At times the batteries may run down so that there is insufficient power present to run the hydraulic pump 86. The operator may close switch 153, which will complete circuits through diodes 154 and 155 to the Bypass solenoids 120 and 122. Unless the batteries are completely dead, there will still be sufficient power remaining to energize the solenoids so that the Bypass valves 123 and 124 open, to free-wheeling condition. With the wheels unlocked, the scaffold can be pushed or towed with the hydraulic fluid in the hydraulic motors 50 and 51 being pumped through the Bypass valves as the wheels turn.

A battery charger 157 is also provided, this charger being located on frame 11 between the forward pair of batteries 77.

By virtue of the series fluid connection of the individual drive motors 50 and 51, the efficiency of the driving apparatus is substantially increased. It is customary in devices such as generally described herein to use a single fluid motor driving but one of the four wheels. It has been thought that using two-fluid motors for two wheels would not only increase the cost but would be more inefficient since the inherent inefficiency of a hydraulic motor would be doubled. However, it has been found that, with the same motor-driven hydraulic pump, the use of two hydraulic motors in series will produce considerably more speed in the device as compared to the use of a single hydraulic motor acting on a single wheel. It is believed that this increase is due to the fact that mobile scaffolds of the type here involved must have a very rigid frame and unyielding tires for purposes of stability when the scaffold is extended. If the scaffold is resting on or moving along a perfectly level floor, each of the four wheels will firmly contact the floor with a force equal approximately to a fourth of the total weight of the scaffold. However, if there is even a very slight degree of unevenness to the floor, one of the wheels will lift away from the floor so that its contact force will decrease (or be zero if lifted completely from the floor) while the contact force of the other three wheels will be increased. Thus, as the scaffold moves along an uneven floor the weight borne by any one wheel will be varying all the time. When only a singledrive motor is used, there will be a considerable amount of the time when there is insufficient downward pressure on the floor exerted by the drive wheel so that there is some slippage between the wheel and the floor which results in a loss of efficient traction.

When two drive wheels are used the traction efficiency definitely increases. When both drive wheels engage the floor and exert equal pressure thereon, half of the power in the hydraulic drive system will be delivered to each drive wheel. If one of the wheels lifts completely off the floor, all of the fluid passing through the hydraulic motor therefor will flow through the other hydraulic motor to positively drive the other drive wheel which will be fully weighted and in firm engagement with the floor. Although the lifted wheel will spin in the air because its motor will still be driving it, very little power will be used so that essentially all of the power is delivered to the wheel which is in full tractive engagement with the floor. Since the weight of the device will always be supported by at least three of the four wheels, at least one of the two drive wheels will always be in good tractive engagement with the floor so that driving power can be delivered thereto.

Thus, the use of the series-connected hydraulic motors gives the general traction advantage that would result if a common shaft extended between the two drive wheels. However, the present arrangement, while obtaining this advantage of a common axle, does not obtain the inherent disadvantage of a common axle. First of all, if a common axle were used, there would be no differential action between the wheels, making it difficult to turn the vehicle. With series-connected hydraulic motors a limited amount of differential action results. As the torque demand on a hydraulic motor increases, more pressure is required to force the fluid therethrough. The higher the pressure the more leakage there is by the rotor. This can be observed in a situation wherein two drive wheels with series-connected fluid motors are used and one of the drive wheels is lifted off the floor. The lifted wheel with no torque demand will free-wheel at a greater rotational speed than the drive wheel which drivingly engages the floor with a high torque demand. In turning, more torque is required for the inside drive wheel than for the outside drive wheel, even though the weight carried by the two wheels is equal. With a greater torque demand, there will be more leakage past the rotor for the inside wheel drive motor and the inside wheel will be driven at a lesser speed than the outside drive wheel. The degree of this differential action will depend upon the volumetric efficiency of the particular fluid motors used.

The use of series-connected fluid motors will also provide for shock absorption in case one of the drive wheels runs into a solid obstruction, such as a small curb, over which it must roll. If a common solid axle were used, the drive wheel encountering the obstacle would be forced abruptly against and onto the obstacle by the action of the other drive wheel, delivering an abrupt shock to the vehicle. With a series-connected fluid motor system the shock is absorbed by the hoses of the fluid system which can expand by a slight degree so that the wheel hitting the obstacle can momentarily slow before being driven up onto the obstacle.

Use of series-connected fluid motors also has an advantage in that the elimination of an axle extending from one drive wheel to the other makes it possible to provide an unobstructed space between the drive wheels for placement of other components of the overall system. In instances where compactness is desired, as in the present mobile scaffold, this is a significant advantage.

I claim:
1. A mobile device comprising:
   a. a generally rectangular frame,
   b. a plurality of ground-engaging wheels mounted on said frame,
   c. a first hydraulic motor drivingly connected to one of said wheels,
   d. a second hydraulic motor drivingly connected to another of said wheels,
   e. a hydraulic pump mounted on said frame,
   f. power means mounted on said frame for driving said pump,
   g. a fluid conduit having two ends, said first and second hydraulic motors being connected in series in said conduit between the two ends thereof,
   h. means including a valve for connecting said pump to said conduit to enable fluid under pressure from said pump to flow through said conduit, said valve having a first position connecting the output of said pump to one end of said conduit and a second position blocking flow of fluid through said conduit,
   i. means forming a bypass passage connected at its ends to the ends of said conduit whereby both of said motors are bypassed, said bypass passage having a flow restrictor therein,
   j. bypass valve means in said bypass passage having an open position allowing fluid to flow through said bypass passage and a closed position preventing fluid flow through said bypass passage.

2. Apparatus as set forth in claim 1 and further including:
   k. control means for sequentially:
      1. opening said bypass valve means while said valve ($h$) is in its second position;
      2. moving said valve ($h$) to its first position and maintaining said bypass valve means open;
      3. closing said bypass valve means while maintaining said valve (h) in its first position.

3. Apparatus as set forth in claim 1, wherein said valve ($h$) has a third position connecting the output of said pump to the other end of said conduit.

4. Apparatus as set forth in claim 1 and further including:
   k. means forming a second bypass passage connected at its ends to said conduit, said second bypass passage having a flow restrictor therein,
   l. second bypass valve means for opening and closing said second bypass passage to fluid flow therethrough.

5. Apparatus as set forth in claim 4, wherein said valve ($h$) has a third position connecting the output of said pump to the other end of said conduit.

6. Apparatus as set forth in claim 4 and further including:
   m. control means for sequentially:
      1. opening both bypass valve means while said valve ($h$) is in its second position,
      2. moving said valve ($h$) to its first position while maintaining both said bypass valve means open,
      3. closing one of said bypass valve means while maintaining said valve ($h$) in its first position,
      4. closing both of said bypass valve means while maintaining said valve ($h$) in its first position.

7. Apparatus as set forth in claim 6 wherein said control means ($m$) causes energization of said power means ($f$) while said valve ($h$) is in its first position.

8. Apparatus as set forth in claim 6 and further including:
   n. an elevatable platform mounted on said frame,
   o. override means responsive to elevation of said platform for preventing closure of both said bypass valve means by said control means ($m$) while said valve ($h$) is in its first position.

* * * * *